US010198062B2

(12) United States Patent
Fuks et al.

(10) Patent No.: US 10,198,062 B2
(45) Date of Patent: Feb. 5, 2019

(54) MICROPROCESSOR TO RESUME CLOCKING AND EXECUTION BASED ON EXTERNAL INPUT PATTERN DETECTION

(75) Inventors: Adam Fuks, Mountain View, CA (US); Rob Cosaro, San Jose, CA (US)

(73) Assignee: NXP B.V., Eindhoven (NL)

( * ) Notice: Subject to any disclaimer, the term of this patent is extended or adjusted under 35 U.S.C. 154(b) by 1462 days.

(21) Appl. No.: 12/623,170

(22) Filed: Nov. 20, 2009

(65) Prior Publication Data
US 2011/0126215 A1 May 26, 2011

(51) Int. Cl.
*G06F 1/32* (2006.01)
*G06F 9/30* (2018.01)

(52) U.S. Cl.
CPC .......... *G06F 1/3237* (2013.01); *G06F 1/3243* (2013.01); *G06F 9/30072* (2013.01); *G06F 9/30079* (2013.01); *G06F 9/30083* (2013.01); *Y02D 10/128* (2018.01); *Y02D 10/152* (2018.01)

(58) Field of Classification Search
CPC .... G06F 1/3206; G06F 1/3237; G06F 1/3243; G06F 1/3246; G06F 11/30; G06F 9/30083
See application file for complete search history.

(56) References Cited

U.S. PATENT DOCUMENTS

| | | | | |
|---|---|---|---|---|
| 5,355,503 A | * | 10/1994 | Soffel et al. | 713/322 |
| 5,495,617 A | * | 2/1996 | Yamada | 713/323 |
| 5,586,332 A | * | 12/1996 | Jain et al. | 713/322 |
| 5,920,258 A | | 7/1999 | Kusyk et al. | |
| 6,193,422 B1 | * | 2/2001 | Belt et al. | 713/320 |
| 6,343,363 B1 | | 1/2002 | Maher et al. | |
| 6,601,178 B1 | * | 7/2003 | Gulick | 713/322 |
| 6,654,895 B1 | * | 11/2003 | Henkhaus et al. | 713/320 |
| 6,708,259 B1 | * | 3/2004 | Wyland | 711/154 |

(Continued)

FOREIGN PATENT DOCUMENTS

EP 0229692 A2 7/1987
EP 0581480 A1 2/1994

OTHER PUBLICATIONS

Ekanayake, V. et al. "An Ultra Low-Power Processor for Sensor Networks", ACM SIGPLAN Notices—ASPLOS '04, vol. 39, No. 11, pp. 27-36 (Nov. 2004).

(Continued)

*Primary Examiner* — David J. Huisman

(57) ABSTRACT

Various exemplary embodiments relate to an event-driven processing unit (EPU) and a related method. A microprocessor may halt processing instructions when it executes a halting command. Thereafter, an EPU clock may stop its processing cycle and therefore halt microprocessor execution until it receives a start signal by a pattern detector. The pattern detector may use a plurality of bit slices to monitor a plurality of external inputs for the occurrence of events specified by the user. Some embodiments may also allow the user to check functioning by skipping upcoming instructions if a monitored event did not occur. By halting the EPU clock and the execution flow of the microprocessor, the event-driven microprocessor minimizes waste associated with executing a main control loop while waiting for a monitored event to occur. This may save processing capacity, memory, and power associated with continually running the main control loop.

23 Claims, 7 Drawing Sheets

(56) References Cited

U.S. PATENT DOCUMENTS

| | | | |
|---|---|---|---|
| 6,779,122 B2 * | 8/2004 | George et al. | 713/330 |
| 6,825,689 B1 | 11/2004 | Snyder | |
| 7,434,039 B2 * | 10/2008 | Fischer | 712/244 |
| 7,725,750 B2 * | 5/2010 | Ashish et al. | 713/323 |
| 7,818,549 B2 * | 10/2010 | Soderquist et al. | 712/224 |
| 2004/0030819 A1 | 2/2004 | Williams | |
| 2008/0055280 A1 * | 3/2008 | Bi et al. | 345/179 |

OTHER PUBLICATIONS

Extended European Search Report for Patent Appln. No. 10191415.8 (dated Feb. 11, 2017), 10 pages.

* cited by examiner

|  | | OP-CODE |
|---|---|---|
| CONFIGURATION INSTRUCTIONS | | |
| XXXX XXXX XXXX XXXX | XXXX XXXX 0000 0000 | CFG_SOURCE |
| XXXX XXXX XXXX XXXX | XXXX XXXX XXX0 0100 | CFG_MUX |
| XXXX XXXX XXXX XXXX | XXXX XXXX 0000 1000 | CLR_FLOPS |
| XXXX XXXX XXXX XXXX | XXXX XXXX 0000 1100 | ENABLE ORs |
| EXECUTION FLOW INSTRUCTIONS | | |
| XXXX XXXX XXXX XXXX | XXXX XXXX 0001 0000 | HOLD |
| XXXX XXXX XXXX XXXX | XXXX XXXX 0010 0000 | CHECK |
| XXXX XXXX XXXX XXXX | XXXX XXXX 0011 0000 | RETURN |
| XXXX XXXX XXXX XXXX | XXXX XXXX 0001 1000 | VECTORED_HOLD |
| XXXX XXXX XXXX XXXX | XXXX XXXX X011 1100 | GOTO |

FIG. 4

MICROPROCESSOR TO RESUME CLOCKING AND EXECUTION BASED ON EXTERNAL INPUT PATTERN DETECTION

TECHNICAL FIELD

Embodiments disclosed herein relate generally to real time control systems and event processing unit architecture.

BACKGROUND

In modern computer systems, a typical central processing unit (CPU) performs an event processing that constantly overlaps the CPUS's execution of computation functions with the execution of input/output (I/O) functions. Event-based programs help the CPU s run multiple tasks by using a computation structure that features a main control loop ("main loop") that allows for breaks, running a collection of callback functions whenever an "event," which is a pre-defined kind of occurrence outside the program of the main loop, occurs. These callback functions are associated with event types. These event types may include, but are not limited to: user actions (such as keyboard and mouse actions), completion of an internal I/O function, timed hardware events, and arrival of data from another computer. Complete processing of a particular event may also involve a sequence of callbacks that are triggered by one or more successive events.

Event-driven programs use a library of events that contains an association table correlating specific events with specific callbacks to support the CPU's management of events as they occur. The callback functions may be machine instructions directing the CPU or other hardware components to take specific actions. The library may also contain the main loop, which alternates the state of operation between waiting for an event to occur and calling the associated callback. The main loop may be seen as comprising two distinct sections: an event selection section that checks for the occurrence of an event, and an event-handling section that may be a subroutine or method corresponding to the event that handles the event through a callback.

Microcontrollers, which are usually designed for specific, dedicated applications, may also be implemented to handle events. Microcontrollers, though having a processing unit, also contain other components, such as timers, serial I/O, program memory, to handle specific functions. As a result, microcontroller design emphasizes simplicity to handle its dedicated function. A microcontroller may also supplement the function of a CPU, processing certain instructions in lieu of the CPU. Given a series of instructions, a microcontroller may be designed to handle events in a more complex manner. Microcontrollers may be designed to monitor and handle multiple events that occur from multiple inputs or components.

Previous implementations for event-driven programming have generally related both to software and hardware implementations in the CPU. These implementations use the main control loop, i.e., the CPU, to monitor for events. Among other effects, this meant that, in some instances, such as an idling "waiting for interrupt," the CPU could not stop processing while waiting for an event to occur. Instead, the CPU ran the main control loop, constantly executing instructions in order to stay in the loop, which was time consuming and drained system resources simply while waiting for another event to occur. For some events like I/O operations from infrequently-used peripherals, such as, for example, faxes, scanners, and printers, the persistent monitoring resulted in great waste of energy and system resources.

In view of the foregoing, it would be desirable to more efficiently and reliably monitor events that trigger microprocessor action. More specifically, it would also be desirable to design a microcontroller to handle complex events, while maintaining a simple microcontroller design, maintaining low power consumption by a microprocessor within the microcontroller, and enabling the monitoring various devices for specific events to occur.

SUMMARY

The present embodiments provide, among other features and benefits, an event-driven low-power microcontroller that may monitor simultaneous complex event source combinations. A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments may relate to a microprocessor for handling events, the microprocessor comprising: a pattern detector comprising a plurality of bit slices to monitor a plurality of external inputs for at least one triggering event from a plurality of triggering events to occur, wherein each bit slice monitors a single input of the plurality of external inputs for a triggering event from the plurality of triggering events. The microprocessor may include one or more state machines that provide, in combination with a pattern detector of various embodiments, for monitoring for complex simultaneous interrupt events and Boolean and temporal patterns, including providing such monitoring with little or no execution power required.

According to one aspect, a microprocessor according to various embodiments may include, in combination with a pattern detector comprising a plurality of bit slices to monitor a plurality of external inputs for a plurality of triggering events, a memory comprising an instruction store that maintains a list of instructions for the microprocessor to retrieve, a state machine and operation code interpreter (SMOI) that retrieves and executes at least one instruction from the instruction store, a clock that enables SMOI execution of a series of instructions, wherein the clock stops and halts further SMOI execution when the SMOI executes a halting command, and the clock restarts and resumes further SMOI execution when the clock receives a logical output from the pattern detector.

Various embodiments may also relate to a method of handling an event using a microprocessor, the method including generating, by a pattern detector, a start signal in response to at least one of a plurality of events from at least one of a plurality of external inputs monitored by the pattern detector occurring, starting, by a clock, a processing cycle to enable execution of instructions by a state machine and operation code interpreter (SMOI) the clock receives a start signal from the pattern detector, retrieving, by the SMOI, a stored instruction, and, executing, by the SMOI, a retrieved instruction.

Various embodiments may also relate to a method of handling an event using a microprocessor, the method including generating, by a pattern detector, a start signal in response a logical combination of a plurality of events from at least one of a plurality of external inputs monitored by the pattern detector occurring, starting, by a clock, a processing cycle to enable execution of instructions by a state machine and operation code interpreter (SMOI) the clock receives a start signal from the pattern detector, retrieving, by the SMOI, a stored instruction; and executing, by the SMOI, a retrieved instruction.

It will be understood by a person of ordinary skill in art upon reading this disclosure that the various exemplary embodiments enable complex monitoring of events from a series of inputs, which may include monitoring of different events from the same input. This may further provide for the user to create finite state machines that can be configured for each state triggered by various events. This may also allow the user to monitor for complex combinations of events that occur simultaneously and monitor and execute instructions based on a specific sequence of events.

BRIEF DESCRIPTION OF THE DRAWINGS

In order to facilitate better understanding of various exemplary embodiments, reference is made to the accompanying drawings, wherein:

FIG. 4 is a table of exemplary instruction codes for the respective components of an exemplary microprocessor;

DETAILED DESCRIPTION

Figure 1:
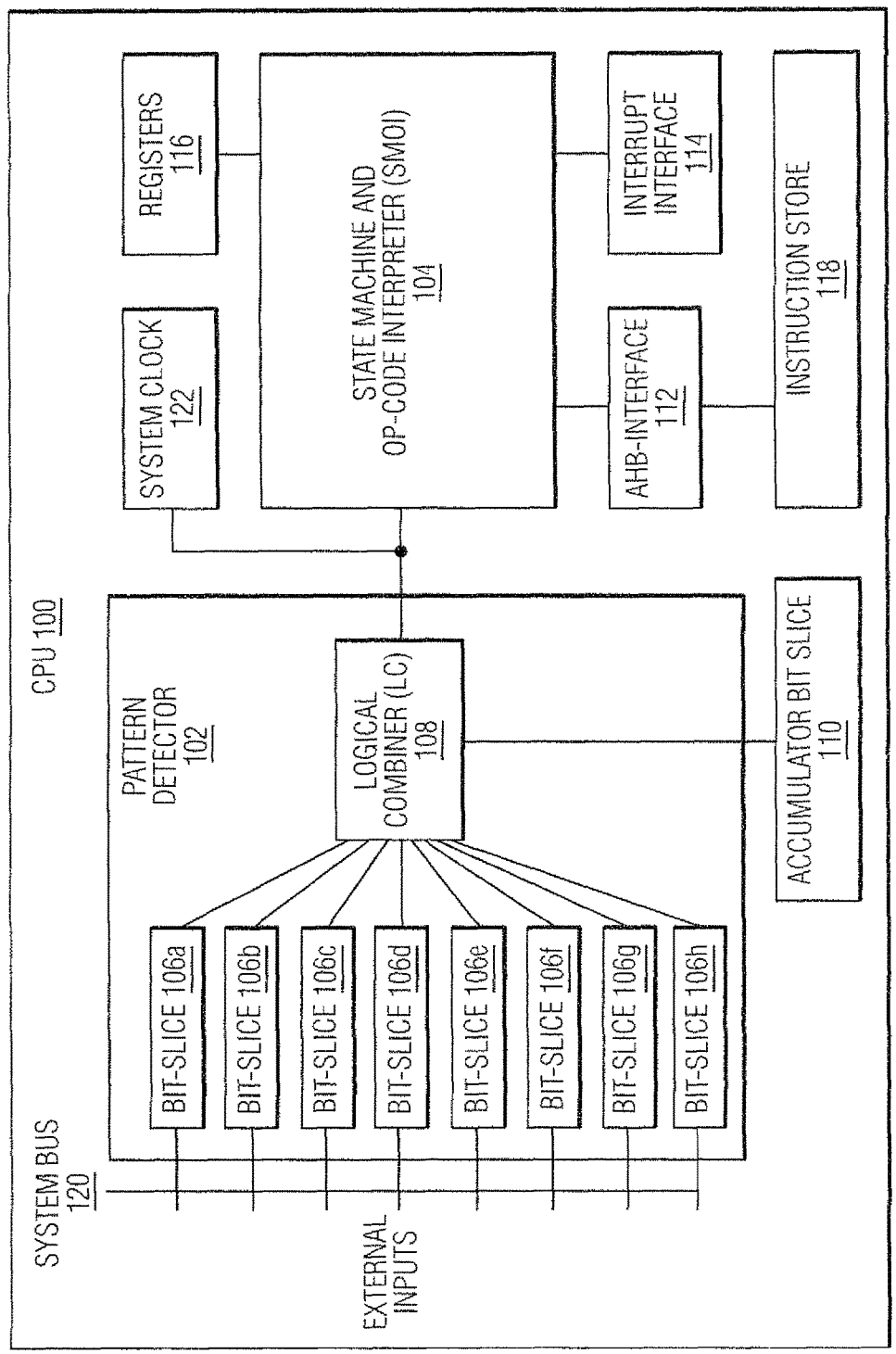
FIG. 1 is a functional block of an exemplary event-driven event processing unit.

Referring now to the drawings, in which like numerals refer to like components of steps, there are disclosed broad aspects of various exemplary embodiments.

In FIG. 1 is a functional block of an event-driven event processing unit (EPU) 100. EPU 100 may be a component of a computer system that carries out a series of instructions by a user or other computer systems. EPU 100 may be a microprocessor that supplements other processing units in the computer system; EPU 100 may also be a primary microprocessor. EPU 100 may be located on an EPU chip and may contain various components shown FIG. 1, in addition to other components not shown in FIG. 1, but that may be identified by a person of ordinary skill in the art upon reading this disclosure. According to one embodiment, the functional blocks forming the EPU 100 may comprise a pattern detector 102, a state machine and an op-code interpreter (SMOI) 104, bit slices 106a-h, a logical combiner (LC) 108, an accumulator bit slice 110, an Advanced High-Performance Bus (AHB) interface 112, an interrupt interface 114, registers 116, an instruction store 118, an EPU bus 120, and an EPU clock 122. It will be understood that FIG. 1 is a functional diagram representing one example implementation of one EPU 100 according to one embodiment; other hardware implementations may be different, yet contain the same functionality as that illustrated.

During an exemplary operation, the plurality of bit slices 106a-h in pattern detector 102 may receive at least one or more external inputs; each bit slice 106a-h may receive every external input. In some embodiments, each bit slice 106a-h may receive every external input through an EPU bus 120. In other embodiments, each bit slice 106a-h may receive every external input as separate inputs (not shown), with every input connected to each bit slice 106a-h in parallel. In another embodiment, each bit slice 106a-h may be connected to only one external input. The output of the pattern detector 102 may be the output of logical combiner 108, which may be connected to the microprocessor state machine and op-code interpreter (SMOI) 104. In other embodiments, the output of pattern detector 102 may be the output of one of the bit slices 106a-h. The output of pattern detector 102 may trigger SMOI 104 execution of a specific instruction or subroutine of instructions if SMOI 104 was halted or in a powered-down state.

SMOI 104 may then execute a series of machine instructions saved in the instruction store 118. Some machine instructions may alter the state of SMOI 104. Some machine instructions may alter what events pattern detector 102 may monitor. SMOI 104 may continue to perform machine instructions until, for example, SMOI 104 receives a specific command to halt further execution. This command may be a machine instruction, such as a HOLD instruction. Other commands to halt execution flow in accordance with operations of the described embodiments may be identifiable by a person of ordinary skill in the art upon reading this disclosure and/or upon practicing the described embodiments. Upon reaching a halting command, SMOI 104 may halt EPU clock 122 that may control the execution flow of SMOI 104 and may halt any further execution of instructions until, for example, EPU clock 122 receives a logical bit from pattern detector 102 to resume. EPU clock 122 may then restart from a start signal received from the output of pattern detector 102, which may be a logical bit. SMOI 104 may then respond to the restarted EPU clock 122 by resuming execution of machine instructions until SMOI 104 receives another halting command. The regular operation of EPU 100 may therefore differ from prior hardware implementations of event-driven programs, as SMOI 104 execution may remain halted between triggering events rather than, for example, continuing to run a main control loop. Such microprocessor operation may result in several advantages, such as, for example, limiting the interrupt load of the microprocessor, reducing the latency of events triggered in the event-driven program, and reducing power consumption by EPU 100.

Pattern detector 102 may be located in EPU 100 and may receive a series of external inputs to monitor at least one event. Pattern detector 102 may also monitor multiple events simultaneously. Pattern detector 102 may monitor for a combination of events to occur and may provide a positive logical bit when a combination of events is true. Accordingly, a user may configure pattern detector 102 to monitor for a Boolean event source combination. For example, if pattern detector 102 contains eight bit slices 106a-h, a Boolean combination of ABC+D+EF+G+H may produce a positive logical bit output from pattern detector 102 when the Boolean combination is correct, i.e., events monitored by bits slices 106a-c are simultaneously triggered, or an event monitored by bit slice 106d is triggered, etc.

Pattern detector 102 may trigger the execution flow of SMOI 104 by detecting a specific event or combination of events from its external inputs and causing SMOI 104 to execute a specific machine instruction or instruction set as a result of an event being detected. Pattern detector 102 may also use a detected event to resume the execution flow of SMOI 104 when it is halted. In such instances, pattern detector 102 may use the detection of an event or combination of events it is monitoring to produce a start signal for EPU clock 122. This start signal may be in the form of a logic bit (i.e., "1"). Pattern detector may trigger the execution of specific machine instructions by SMOI 104 based on the state of SMOI 104. This may therefore enable the user to configure a finite state machine (FSM), where an event may change the state of SMOI 104. For example, SMOI may have 6 finite states, labeled herein for convenience as 1'-6'. Pattern detector 102 may be configured to monitor for the Boolean expression of ABC+D+EF+G+H and may trigger SMOI 104 in state 2' to execute and shift to state 4' when the Boolean statement is true. Accordingly, pattern detector may trigger different states based on a pattern of monitored events occurring in sequence.

Pattern detector 102 may include at least a plurality of bit slices 106a-h connected to the external inputs and a logical combiner 108 connected between bit slices 106a-h and SMOI 104. Bit slices 106a-h may receive a plurality of external inputs and may output the monitored results as a logical bit to logical combiner 108. As will be described in further detail below in connection to FIG. 2, bit slices 106a-h may monitor external inputs for various behaviors, such as when monitored external input changes a logical value. The output of each bit slice 106a-h may be logically combined before reaching logical combiner 108. The output of each bit slice 106a-h may also bypass logical combiner 108 and connect in parallel with SMOI 104.

Logical combiner 108 may receive at least one output from bits slices 106a-h and the output of accumulator bit slice 110 and may produce a logical value to send to SMOI 104. Logical combiner 108 may be a logical circuit equivalent to an OR gate. The output of pattern detector 102 may be a logic bit, such as a "1" or "0." When SMOI 104 execution is halted, the logic bit produced by logical combiner 108 may serve as a start signal, which may indicate whether, for example EPU clock 122 should resume. The resuming of EPU clock 122 may then resume SMOI 104 instruction execution until SMOI 104 receives another halting command.

The plurality of bit slices 106a-h may be connected to each received external input and the output of each bit slice 106a-h may be connected to both the input of logical combiner 108 and the input of SMOI 104. Bit slices 106a-h may be modules that monitor a received external input for a specific event. Bit slices 106a-h may be configured through the execution of specific machine instructions. For example, each bit slice 106a-h may be configured by a "bit piece" of a decoded machine instruction, such as a 3-bit piece of a 32-bit decoded instruction, with the first bit slice 106a being controlled by, for example, the first three bits in a received 32-bit instruction, while second bit slice 106b may be controlled by the next three bits of the same instruction.

Each bit slice 106a-h may track a single input when receiving multiple external inputs. In one exemplary embodiment, multiple bit slices 106a-h may monitor the same external input for different events. For example, first bit slice 106a may track external input '3' for a logical value of "1," while fourth bit slice 106d may track the same external input '3' for a rising edge, indicating a change from a logical value from "0" to "1." The output of each bit slice 106a-h may control EPU clock 122 through SMOI 104. The output of each bit slice 106a-h may be combined as a Boolean combination before reaching logical combiner 108. A Boolean combination of bit slices 106a-h may be configured by a user, which may be re-configure bit slices 106a-h through a machine instruction. A Boolean combination of bit slices 106a-h may be re-configured based on the state of SMOI 104.

The logical combiner (LC) 108 may receive outputs of bit slices 106a-h and accumulator bit slice 110 and may output a logical bit that indicates if monitored conditions are met. For example, a logical bit output from LC 108 of "1" may indicate that SMOI 104 should resume execution of instructions from, for example, instruction store 118. The output of LC 108 may also trigger SMOI 104 to change states. The output value of the LC 108 may be a binary logical value, such as a "1" or "0." The output of LC 108 may resume the execution of SMOI 104 by starting EPU clock 122. In an example operation according to one alternative embodiment, SMOI 104 may respond to an LC 108 output of "1" by continuing to the next instruction in a program, while responding to an LC 108 output of "0" by skipping that instruction in a program and rather executing the subsequent instruction. In some embodiments, when EPU clock 122 is halted, SMOI 104 may ignore the output of LC 108, and instead respond to the direct output of one or more bit slices 106a-h to resume EPU clock 122.

The accumulator bit slice 110 may be used to allow SMOI 104 to perform simple arithmetic functions that require a count, such as, in an illustrative example, arithmetic, execute loops, and other count events. A person of ordinary skill will recognize similar applications upon reading this disclosure. The accumulator bit slice 110 may be connected to two accumulator registers. The use of multiple accumulator registers may allow SMOI 104 to track, control, and iterate two different counts simultaneously. The accumulator bit slice 110 may monitor the values of the two accumulator registers and, as will be discussed in further detail in connection with FIG. 3, use a multiplexer to output a logical bit to logical combiner 108. The accumulator bit slice 110 may, for example, check for "0" and for the crossing of "0" for either of the two accumulator registers. In one embodiment, the first accumulator register may take and process any read and write functions directed towards the accumulator bit slice 110. The first accumulator register may enable the use of, for example, XOR and OR logical functions by SMOI 104 during execution of certain computations. The second accumulator register may be used as an iterator. The second accumulator register may therefore be incremented or decremented without affecting the value of the first accumulator register.

State machine and op-code interpreter (SMOI) 104 may be a component that fetches, decodes, and executes the op-codes from machine instructions retrieved from, for example, instruction store 118. SMOI 104 may also include a state machine that maintains multiple states and may change state based on the execution of specific instructions. SMOI 104 may operate using four fundamental processing steps utilizing machine instructions: (1) fetch, (2) decode, (3) execute, and (4) writeback. SMOI 104 may use EPU clock 122 to implement these processing steps, which uses the EPU clock 122 to maintain a cycle period in which to perform a fundamental step. As known to a person of ordinary skill, the clock cycle may be used by SMOI 104 to pipeline the execution of instructions so that different steps of instruction execution take the same amount of time.

During the first step of fetching, SMOI 104 of EPU 100 may retrieve a machine instruction stored in an instruction memory, such as instruction store 118 described in further detail below. The retrieved instruction may include an "op-code" (operation code) that specifies to SMOI 104 which operation to perform and, may also provide one or more operands or other parameters for the instructed operation. The storage of instructions for SMOI 104 may be the instruction store 118, or may be another memory device within the EPU, or an instruction cache memory off of the EPU chip. SMOI 104 may access memory located off the EPU chip through AHB interface 112. SMOI 104 may then follow its fetch instruction by using its instruction set architecture (ISA) to decode the fetched instruction. In an example embodiment, the machine instruction contains an op-code and at least one operand. As will be discussed below in connection with FIG. 4, the machine instruction may use an addressing mode that splits the operand among bit slices 106*a-h* when the machine instruction involves their configuration.

Thereafter, during the execution step, various components in EPU 100 will perform the instruction or have the instruction performed upon it. The instructions may be component operations, such as operations for AHB interface 112 and bit slices 106*a-h*. The instructions may also be specific execution flow instructions, such as HOLD, CHECK, and GOTO, which may control the next machine instruction retrieved in the execution flow. In the final step of writeback, SMOI 104 may record the result of the execute step, if there is any, into memory, such as, for example, the instruction store 118. SMOI 104 may implement these fundamental instruction execution steps in concert and may also form loops from a series of machine instructions. SMOI 104 may also implement subroutines of a program consisting of multiple series of machine instructions. For example, SMOI 104 may retrieve a multi-bit instruction containing an R-bit operand and an S-bit op-code, decode the op-code and perform the instruction. As specific illustration, SMOI 104 may retrieve a 32-bit machine instruction, having a 24-bit operand and an 8-bit op-code for performing an operation on, for example, the first multiplexers in bit slices 106*a-h*. 24-bit operand and an 8-bit op-code for performing an operation on, for example, the first multiplexers in bit slices 106*a-h*.

SMOI 104 may receive as inputs the output logical bit of logical combiner 108 or the outputs of bit slices 106*a-h*. SMOI 104 may either respond to the output logical bit of logical combiner 108 or one or more of bit slices 106*a-h* to trigger or resume execution of further instructions by responding to a resumed EPU clock 122.

Advanced High-Performance Bus (AHB) interface 112 may be connected to SMOI 104 and may be used to, for example, toggle I/Os, service peripherals, and store data in memory like random access memory (RAM). AHB interface 112 may be used to connect and transfer data from the pattern detector 102 and SMOI 104 with other components elsewhere on the EPU chip and elsewhere within the computer system. For example, SMOI 104 may use AHB interface 112 to receive machine instructions from instruction store 118 or other memory components that may contain instructions, such as the instruction cache memory that may be located off the EPU chip.

Interrupt interface 114 may be used by SMOI 104 to, for example, output an interrupt towards components outside EPU 100. Interrupt interface 114 may call or wake another processor in the computer system, such as, for example, an advanced RISC machine (ARM) CPU. Interrupt interface 114 may be used by EPU 100 to simultaneously execute instructions with SMOI 104 and another processor. Accordingly, in some embodiments, EPU 100 may act as a co-processor to another processing unit, such as an ARM CPU. For example, if the EPU 100 does not contain the computational power to execute an instruction or program, SMOI 104 may forward the instruction or program through interrupt interface 114 to another processor outside EPU 100 to handle the task.

The series of registers 116 may store op-codes that enable various functions in EPU 100. These registers 116 may include registers for specific machine instructions, such as, for example, the above-described instructions to configure the first multiplexers in bit slices 106*a-h*, arbitrarily referenced as CFG_SOURCE, and the above-described instructions to configure the mux, arbitrarily referenced herein as CFG_MUX. Other registers in EPU 100 may be represented as distinct components in FIG. 1. These separate registers may include, for example, accumulator and iterator registers (both in accumulator bit slice 110). Other registers in 116 may include, but are not limited to: return address, Enable OR, incremental write pointer (WRPTR), incremental read pointer (RDPTR), and general purpose registers. Registers 116 may be written by the manufacturer into a memory component stored in EPU 100. Other memory components would be apparent to a person of ordinary skill in the art. These may include flash, RAM, or ROM memory. Registers 116 may be called and used by other components in EPU 100, even while SMOI 104 is in a powered-down state and not actively executing instructions.

In some embodiments, one bit of an op-code register such as, for example, the 32nd bit, may be monitored by a user through a "Trace Data" pin. A user may therefore combine the Trace Data pin with a "Trace Clock" function that provides a clock pulse every time the op-code register is used to retrieve a trace of the instructions received by EPU 100. In some embodiments, the user may insert a pseudo-random pattern of "1" and "0" into the 32nd bit of various op-codes, as the 32nd bit may not regularly be used otherwise. The user may therefore observe a pattern based on tracing the values of the 32nd bit. By following the outputted data pattern, a user may debug the execution flow of the microprocessor even if it goes astray and does not follow the intended execution flow. In the case the pattern is ambiguous, the machine instructions may be re-compiled with a different pattern of pseudo-random numbers in the ambiguous parts to help solidify further determinations.

EPU bus 120 may connect all the inputs of bit slices 106*a-h* with external inputs. In the illustrated embodiment, EPU bus 120 may connect eight external inputs to the input of each bit slice 106*a-h* so that each bit slice may receive any of the eight external inputs. In this embodiment, bit slices 106*a-h* may receive all of the external inputs. Each external input may be delivered to every input of bit slices 106*a-h* through EPU bus 120. As EPU bus 120 enables bit slices 106*a-h* to receive an external input simultaneously, one external input may be monitored simultaneously by different bit slices 106*a-h*, which may monitor the same external input for different events. In an alternative embodiment, EPU bus 120 may be replaced by direct connections from each external input to each bit slice 106*a-h*. In another alternative embodiment, each bit slice 106*a-h* may only be connected to one external input.

EPU clock 122 may be a module that maintains the execution flow of SMOI 104 through the use of a processing cycle. SMOI 104 may use EPU clock 122 to control its execution fundamental functions of fetch, decode, execute, and writeback on machine instructions. As known to a person of ordinary skill, SMOI 104 may use EPU clock 122 to implement a pipeline of machine instructions that overlap. EPU clock 122 may maintain time within EPU 100 by maintaining a count of the number of ticks that have taken place since a starting date (epoch). During regular operation, EPU clock 122 may be running a processing cycle that SMOI 104 uses to execute retrieved machine instructions. Consequently, certain machine instructions may halt EPU clock 122, whose stoppage may therefore halt the execution flow of SMOI 104. Stopping EPU clock 122 may cause SMOI 104 to power down and stop further execution in lieu of, for example, running a main loop, until a specific event or events causes the EPU clock 122 to restart and restart the execution by SMOI 104. Thus, the main loop used by other hardware implementations for event-driven programming may be replaced by a power-down/power-up loop of SMOI 104 running by alternatively stopping and starting EPU clock 122.

After discussing relevant components of EPU 100, an exemplary execution is discussed. Pattern detector 102 may monitor an event and trigger SMOI 104 to fetch, decode, and execute machine instructions from instruction store 118. SMOI 104 may execute a specific instruction based on its current state. SMOI 104 may continue to fetch, decode, and execute machine instructions until it reaches a halting command, such as a HOLD or VECTORED_HOLD instruction. When SMOI 104 reaches a halting command, EPU clock 122 may stop and SMOI 104 may halt further execution of machine instructions until EPU clock 122 receives a starting signal from pattern detector 102. In the illustrative embodiment, this starting signal may be a logical bit "1" output from pattern detector 102. Upon receiving a starting signal from pattern detector 102, EPU clock 122 may resume and EPU 100 may resume instruction execution. In an alternative embodiment, EPU clock 122 may not stop, with SMOI 104 instead executing a CHECK instruction after reaching a halting command. The CHECK instruction may allow the user to test the output of pattern detector 102. If the output of pattern detector 102 is "0," SMOI 104 may skip the next machine instruction and execute the subsequent instruction. If the pattern detector 102 output is "1," SMOI 104 may then continue to execute the next instruction.

In an alternative embodiment, EPU 100 may respond to a halting command that is a VECTORED_HOLD instruction. The VECTORED_HOLD instruction may allow pattern detector 102 to simultaneously monitor several events related to various external inputs while the execution remains halted. With a similar execution to the HOLD instruction, the VECTORED_HOLD instruction may halt further SMOI 104 execution of programs until any of a plurality of monitored events occurs. If such at least one event occurs, after EPU clock 122 restarts, SMOI 104 may use a vector table in instruction store 118 to retrieve and execute the machine instruction corresponding to the event that occurred. For example, if pattern detector 104 outputs a Boolean combination of ABC+D+EF+G+H, when a triggered SMOI 104 reaches the VECTORED_HOLD instruction, SMOI 104 may use the vector table to execute a specific instruction based on the bit slice that triggered the execution. If an event triggered bit slice 106d, SMOI 104 may execute the instruction in the vector table corresponding to event D. If a series of events triggered bit slices 106a-c, SMOI 104 may execute the instruction associated with the last bit slice 106c, which corresponds to event C.

Figure 2:
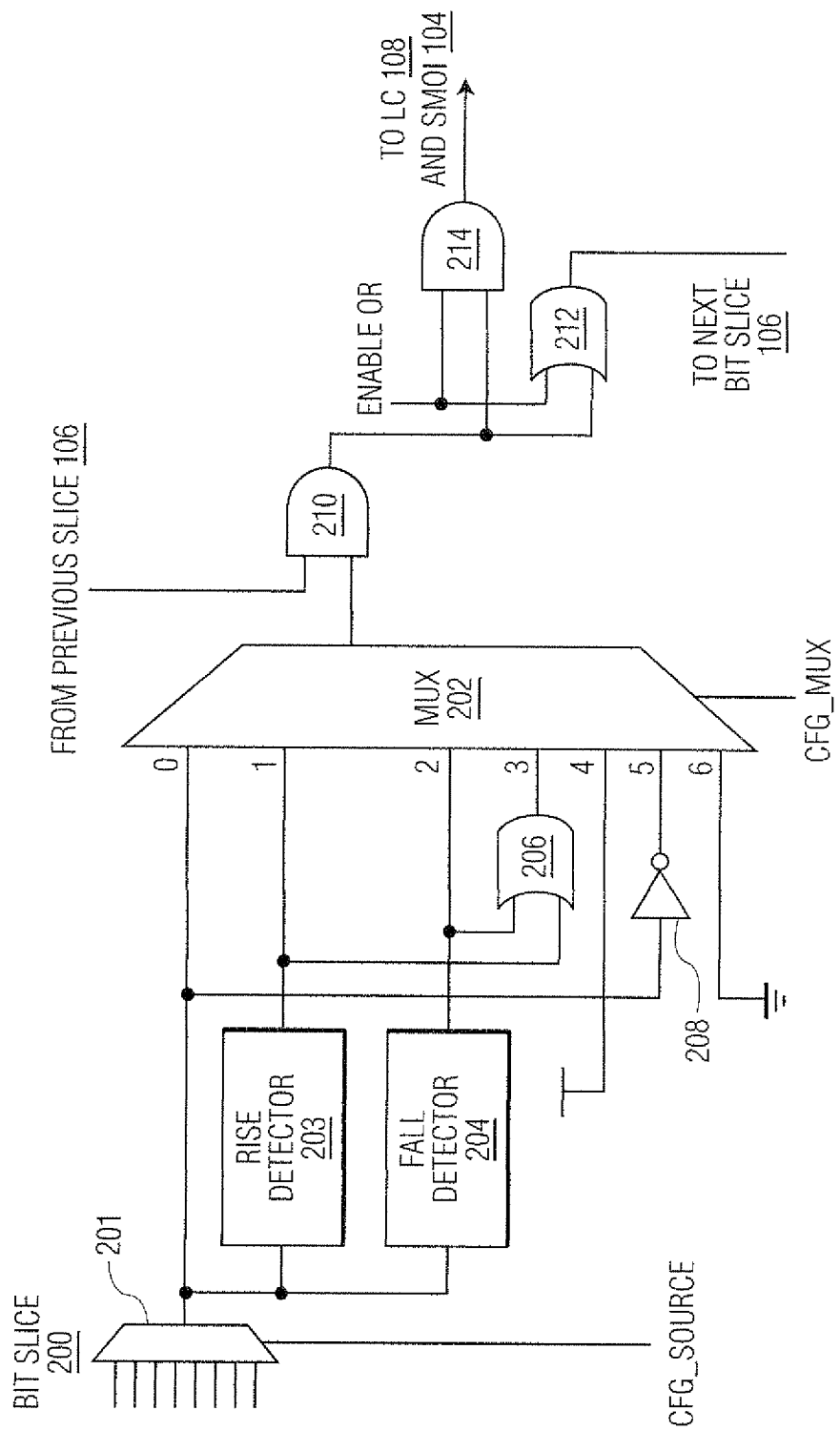
FIG. 2 is a functional block of an exemplary bit slice.

Referring now to FIG. 2, a functional block of an exemplary bit slice is illustrated. In the illustrated embodiment, bit slice 200 contains a first multiplexer 201, second multiplexer 202, rise detector 203, fall detector 204, first OR gate 206, inverter 208, first AND gate 210, second OR gate 212, and second AND gate 214. Using the CFG_SOURCE and CFG_MUX machine instructions stored in registers 116 to configure, bit slice 200 may select a relevant external input and monitor value, respectively, and output a value that indicates whether the monitored event has occurred. The logical output of bit slice 200 may be combined to one or more bit slices 106a-h before reaching logical combiner 108 or SMOI 104.

In the illustrated embodiment, bit slice 200 may receive eight external inputs at first multiplexer 201 and may be configured by the CFG_SOURCE instruction to monitor one specific external input. The CFG_SOURCE instruction may therefore give the user the option of which external inputs to monitor. A user may, for example, use separate bit slices 106a-h to monitor the same external input.

The output of first multiplexer 201, the monitored signal, may serve as one of the inputs for second multiplexer 202, which itself may be configured by the CFG_MUX instruction to monitor the external input for a specific event. Each input into second multiplexer 202 may be capable of monitoring a different event. In the illustrative embodiment for example, second multiplexer 202 may receive seven (7) inputs, with each input monitoring a distinct event related to the monitored signal. A user may therefore use the CFG_MUX instruction to choose which event to monitor. Each input into second multiplexer 202 may monitor distinct events, for example, one input may detect when the value of the external input changes (as indicated at input 3), while another input may detect when the value of the input is a logical "0" (input 5). The bit slice 200 may also ignore the value of external input by selecting an input for second multiplexer 202 an input associated with a logical "1" or "0," (inputs 4 and 6). Other inputs into second multiplexer 202 may include the output of multiplexer 201 (line 0) and its inverse (line 5), the output of a rise detector 203 (line 1), fall detector 204 (line 2), the logical combination of the two through a first OR gate 206 (line 3), and a logical "1" and "0" (lines 4 and 6).

The output of second multiplexer 202, the event-monitored signal, may output through a plurality of logic gates 210-214 that may also connect the output of the second multiplexer 202 with the second multiplexer output of other bit slices 106a-h. The Boolean combination of the bit slices 106a-h may be configured by the user and may allow for the monitoring of multiple events simultaneously in complex combinations. Multiple bit slices 106a-h may be connected through first AND gate 210 and second OR gate 212. The inputs of first AND gate 210 may be the output of second multiplexer 202 and the output from second OR gate of the previous bit slice 106a-h. In the case of first bit slice 106a, a logical "1" may replace the output from the OR gate of previous bit slice.

The output of second AND gate 210 may be connected to second OR gate 212 and second AND gate 214, respectively. Both logic gates 212, 214 may receive the output of first AND gate 210 and an "Enable OR" value as inputs. The "Enable OR" value may be retrieved from an ENABLE_ORs machine instruction in register 116. The Enable OR value may be configured for each bit slice 106a-h to either enable or disable second OR gate 212. This may result in a Boolean combination of the output of bit slices 106a-h, where multiple output values from multiple bit slices 106a-h must be detected simultaneously to secure a logical "1." For example, a user may configure the ENABLE_ORs machine instruction to be true for each bit slice, so that the final logical output coining from the plurality of bit slices 106a-h is A+B+C+D+E+F+G+H. Otherwise, when Enable OR is set as false for each device, the logical output of the bit slices 106a-h is ABCDEFGH. A user may also configure the ENABLE_ORs instruction to only be true for specific bit slices 106*a-h*. This may enable users to implement complex combinations, such as ABC+D+EF+G+H. The output of second OR gate 212 may connect to the input of the second AND gate 210 of the subsequent bit slice 106*a-h*. The output of second AND gate 214 may connect to the input of logical combiner 108 and directly to an input of SMOI 104. In the case of the last bit slice 106*h*, a logical "1" may replace the ENABLE_ORs instruction value. Therefore, at least one bit slice 106*a-h*, for example, last bit slice 106*h*, may then be configured to produce a positive logical bit output at all time during regular detection and operation.

Figure 3:
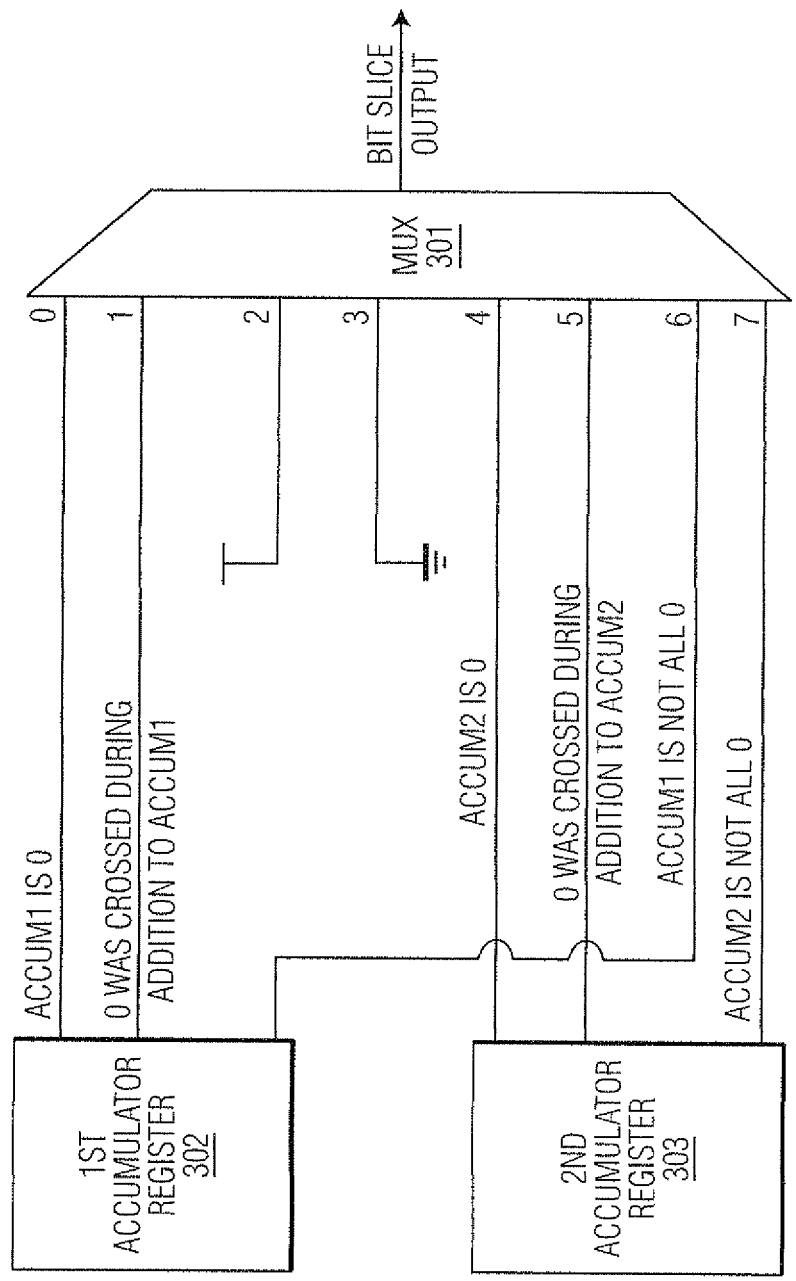
FIG. 3 is a functional block of an exemplary accumulator bit slice.

Referring now to FIG. 3, a functional block of an exemplary accumulator bit slice is illustrated. The output of accumulator bit slice 300 may be connected through an AND gate (not illustrated) with the outputs of bit slices 106*a-h*, which may enable logical combiner 108 to execute various commands, such as the HOLD and CHECK instructions when they are reached.

In the illustrative embodiment, accumulator bit slice 300 may contain a multiplexer 301 that may receive, for example, eight inputs from two accumulator registers 302, 303. Multiplexer 301 may receive as inputs a logical "1" (line 2) and "0" (line 3), and in addition to various inputs monitoring the respective accumulator registers. These additional inputs may include: "Accumulator[x] is 0" (lines 0 and 4), "Accumulator[x] is not all 0" (lines 6 and 7) and "0 was crossed during addition in Accumulator[x]" (lines 1 and 5) where [x] indicates the accumulator register of 1 or 2. Accumulator bit slice 300 may be used by SMOI 104 as a count tracker and may therefore enable SMOI 104 to perform execution loops by using the accumulator bit slice 300 to track changes in the two accumulator registers 302, 303 to conduct a proper count. The use of multiple accumulator registers 302, 303 may allow EPU 100 to track and iterate two different counts simultaneously. In one embodiment, the first accumulator register 302 may take any read and write functions. The first accumulator register 302 may enable the use of, for example, XOR and OR logical functions. The second accumulator register 303 may be used as an iterator. The second accumulator register 303 may therefore be incremented or decremented without affecting the value of the first accumulator 302 register.

Referring now to FIG. 4, a table 400 of exemplary instruction codes is illustrated. Table 400 may include a list of instructions that may be stored in system memory, such as, for example, instruction store 118. Field 401 may contain a "bit word" of the instruction, while field 402 may contain an op-code associated with the bit word. In the illustrative embodiment, the bit word may be a 32-bit instruction. The machine instructions 411-419 populating the table 400 may be split into families of functions. For example, there may be families of instructions for configuration, execution flow, and accumulator functions. Within a family, there may be a set code to identify the op-code through the instruction. For example, for line 415, the last eight bits of the machine instruction are "0001 0000," which correlates to the HOLD operation code. The 32-bit "bit word" may be split into smaller "bit pieces." In the illustrative embodiment, 32-bit CFG_MUX machine instructions may be split into a 24-bit operand, with 8 distinct 3-bit "bit pieces", and an 8-bit CFG_MUX operation code corresponding to the last eight bits. SMOI 104 may interpret the fetched machine instruction to both determine the correlating operation and the relevant component in EPU 100 on which to perform the operation. Each bit piece in the instruction may configure a second multiplexer 202 in each bit slice 106*a-h*. Similarly, the bit pieces comprising the operand of the machine instruction may vary in length and may have various bit pieces of various sizes used to execution functions on different components.

Figure 5:
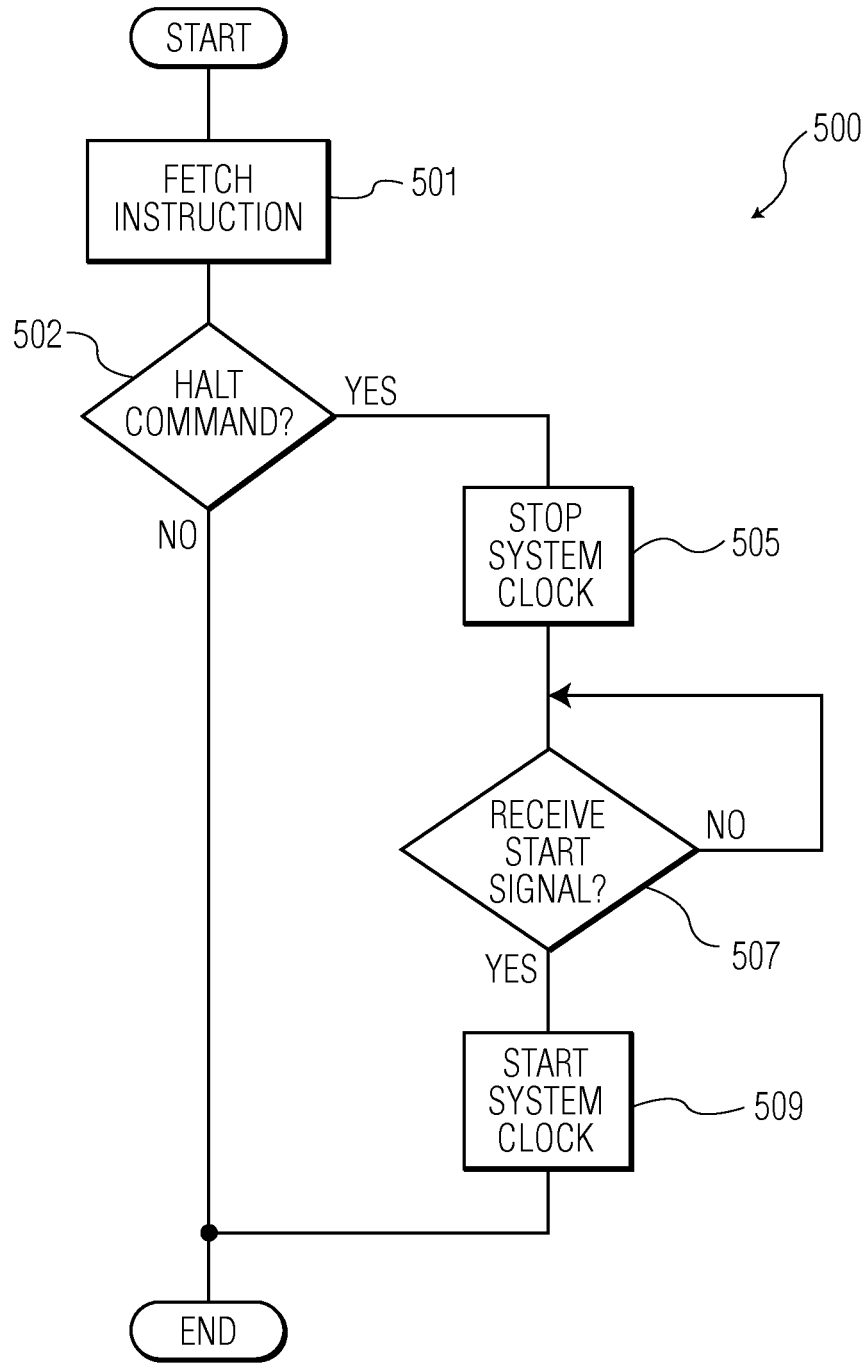
FIG. 5 is a flowchart of an exemplary method of processing a monitored event from an external input.

Referring now to FIG. 5, a flowchart of an exemplary method of processing a monitored event from an external input is illustrated. Specific implementations will be described in further detail below in connection with FIGS. 6-7.

Method 500 may involve the use of pattern detector 102 to trigger and restart operations of SMOI 104 whenever EPU clock 122 stops. EPU clock 122 may be initially stopped or may be stopped in response to a halting command. The use of pattern detector 102 may involve one or more bit slices 106*a-h* monitoring external inputs for a specific event or complex combination of events to occur, and producing a logical bit to trigger EPU clock 122 to restart. Method 500 may result in SMOI 104 effectively powering down during periods that no events occur, which may therefore limit the interrupt load of the microprocessor, reduce the latency of events triggered in the event-driven program and reduce power consumption by EPU 100.

Starting at step 501, SMOI 104 may be triggered to fetch and decode a machine instruction from instruction store 118. Continuing to step 502, once retrieved and decoded, SMOI 104 may determine if the decoded instruction is a halting command. As will be discussed below, the halting command may be, for example, a HOLD instruction or a VECTORED_HOLD instruction. When SMOI 104 reaches a halting command, in step 505, EPU clock 122 may stop and SMOI 104 may halt further execution of machine instructions. Once stalled, the SMOI 104 may in step 507 wait for pattern detector 102 to produce a start signal. SMOI 104 continues waiting until it receives a start signal from pattern detector 102, remaining in a loop around step 507. In the illustrative embodiment, this may be a positive logical bit output from pattern detector 102. Upon receiving a start signal from pattern detector 102, in step 509, EPU clock 122 may resume. At step 511, SMOI 104 may resume execution of instructions, and may proceed to the next machine instruction.

Figure 6:
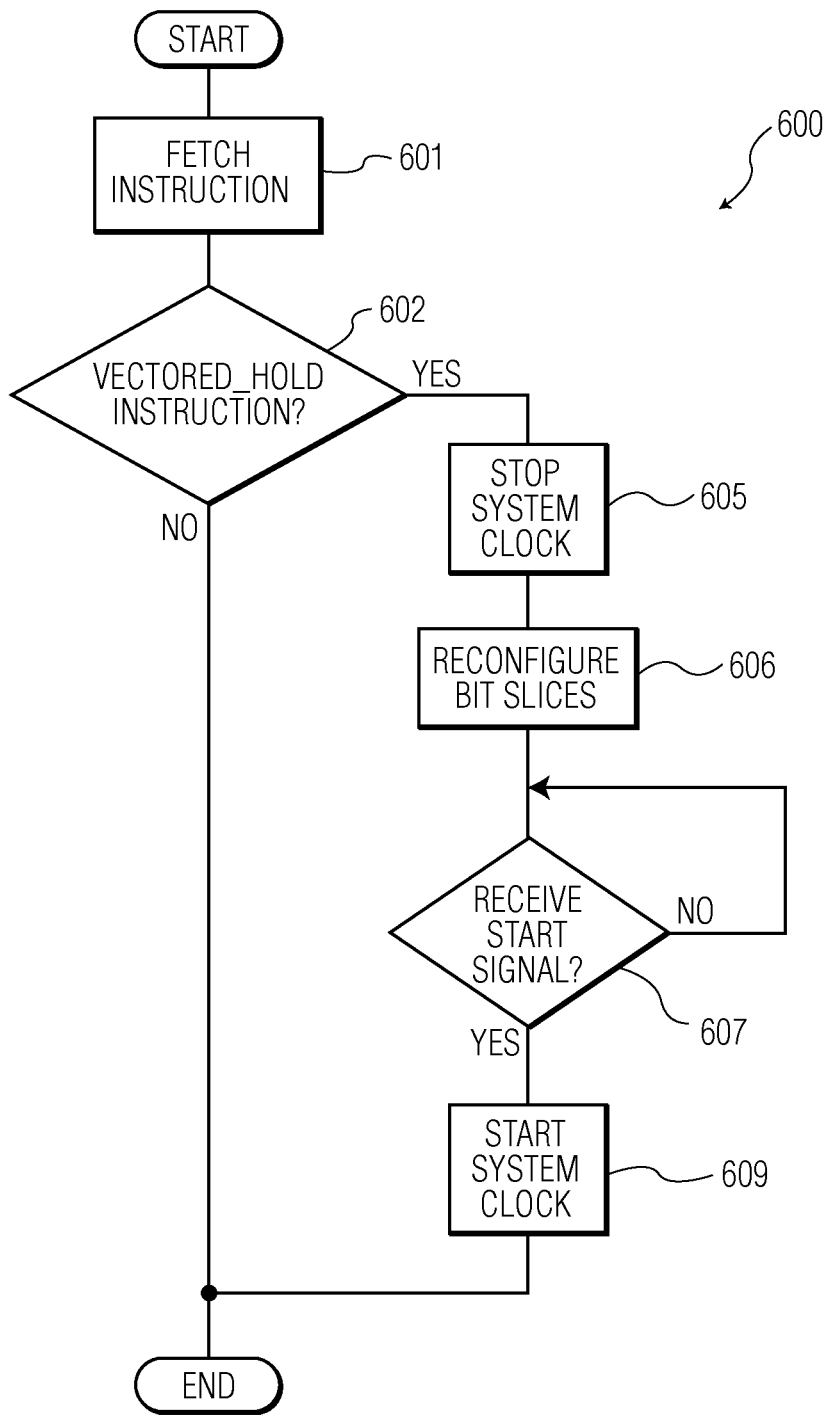
FIG. 6 is a flowchart of an alternative method of processing a monitored event from an external input.

FIG. 6 is a flowchart of a particular exemplary embodiment of a method 500 of processing a monitored event wherein the halting command is a VECTORED_HOLD instruction. Method 600 closely follows the method 500, where in step 601 SMOI 104 may be triggered to fetch and execute a machine instruction, and in step 602 checks for a halting command. In this embodiment, SMOI 104 may respond to a halting command that is a VECTORED_HOLD instruction. The VECTORED_HOLD instruction may allow pattern detector 102 to simultaneously monitor for several events using multiple bit slices 106*a-h* concurrently. Similar to the HOLD instruction, the VECTORED_HOLD instruction may halt further SMOI 104 execution of instructions until a proper combination of events occur based on, for example, the Boolean combination configured by the user. In step 605, EPU clock 122 halts. In addition, at step 606, the VECTORED_HOLD instruction may reconfigure one or more bit slices to monitor for separate events simultaneously, using, for example, the user-defined Boolean combination. Thereafter, at step 607, EPU clock 122 waits for a start signal from pattern detector 102. For method 600, the start signal may any of triggered by a number of different events separately or in combination that monitored by the multiple bit slices 106*a-h*.

If such an event occurs, at step 609, EPU clock 122 may restart and SMOI 104 may use a vector table in instruction store 118 to retrieve and execute a machine instruction corresponding to the event. In the instance where two separate events occur simultaneously, SMOI 104 may retrieve and execute both instructions in an ordered hierarchy defined by the bit slices used. For example, if the VECTORED_HOLD instruction monitors A+B+CD+EF+ G, if a CD event occurred, the machine instruction for the vector associated with bit slice 106d may thereafter be executed by SMOI 104. This may enable users to monitor several events to control the hierarchy of executing such events. Consequently, at step 611, SMOI 104 may execute the instruction associated with the triggered event and may continue the execution flow of instructions.

Figure 7:
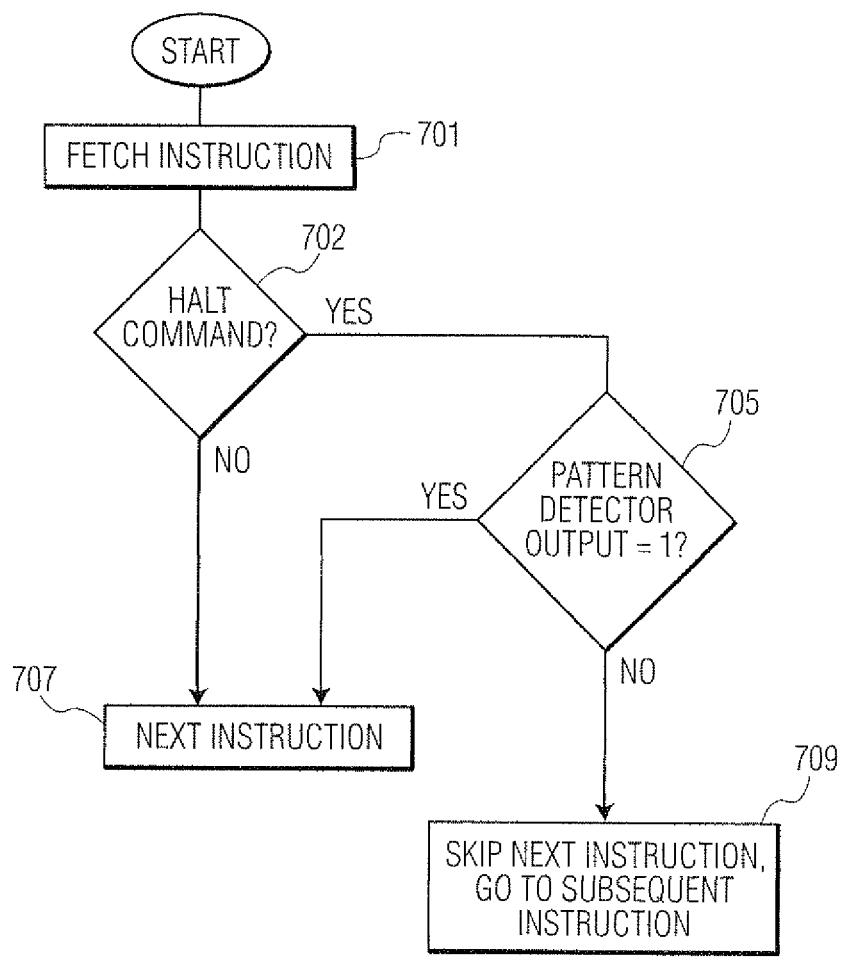
FIG. 7 is a flowchart of another alternative method of processing a monitored event from an external input.

Referring now to FIG. 7, a flowchart of another alternative method of processing a monitored event from an external input is illustrated. Similar to method 500, method 700 differs from method 500 in that a halting command may not cause EPU clock 122 to stop. While steps 701 and 702 correlate to steps 501 and 502, respectively, the action taken at step 705 differs from that of step 505. In the illustrated embodiment, the EPU clock 122 may not stop; rather, SMOI 104 may execute a CHECK instruction after reaching the halting command. The CHECK instruction may allow the user to test the output of pattern detector 102. If the logical combiner 108 output is "1," then SMOI 104 may then continue to the upcoming instruction at step 707. However, if the logical combiner 108 output is "0," SMOI 104 may then skip the upcoming instruction and execute the subsequent instruction at step 709.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A microprocessor configured to handle events, the microprocessor comprising:
    a pattern detector, comprising a plurality of bit slices, that is configured to monitor a plurality of external inputs for occurrence of at least one triggering event from a plurality of triggering events, wherein each bit slice of the plurality of bit slices monitors a single input of the plurality of external inputs for a triggering event from the plurality of triggering events, wherein a first bit slice in the plurality of bit slices comprises a first multiplexer that is configured to receive the plurality of external inputs and outputs a first event-monitored signal, a second multiplexer that is configured to receive a plurality of inputs, including the first event-monitored signal, and outputs a second event-monitored signal, and a logic circuit that is configured to receive both the first event-monitored signal and a second event-monitored signal of a second bit slice and produce a logical output;
    a memory, comprising an instruction store, that is configured to maintain a list of instructions for the microprocessor to retrieve;
    a state machine and operation code interpreter (SMOI) that is configured to retrieve and execute at least one instruction from the instruction store; and
    a clock that is configured to enable SMOI execution of a series of instructions, wherein the clock stops and halts further SMOI execution when the SMOI executes a halting command, and the clock restarts and resumes further SMOI execution when the clock receives a logical output from the pattern detector, wherein the SMOI is powered down until triggered to restart by the logical output from the pattern detector.

2. The microprocessor of claim 1, wherein the first bit slice further comprises:
    a rise detector circuit that is configured to receive the first event-monitored signal and output a positive logical bit into the second multiplexer when a rise in the first event-monitored monitored signal is detected;
    a fall detector circuit that is configured to receive the first event-monitored signal and output a positive logical bit into the second multiplexer when a fall in the first event-monitored signal is detected;
    a logical OR gate that is configured to receive the outputs of both the rise detector circuit and the fall detector circuit and output a positive logical bit into the second multiplexer when either the rise detector circuit or the fall detector circuit outputs a positive logical bit; and
    an inverter that is configured to receive the first event-monitored signal and output an inverse of the first event-monitored signal into the second multiplexer.

3. The microprocessor of claim 1, further comprising:
    an accumulator circuit that is configured to maintain a plurality of counts used by the microprocessor, the accumulator circuit comprising:
    a first accumulator register that is configured to track a first count;
    a second accumulator register that is configured to track a second count; and
    a multiplexer that is configured to receive a plurality of monitored accumulator signals from outputs of the first and second accumulator registers and output a chosen monitored accumulator signal.

4. The microprocessor of claim 3, further comprising:
    a logical combiner that is configured to receive output from the plurality of bit slices and the output of the accumulator circuit and produce the logical output from the pattern detector.

5. The microprocessor of claim 1, further comprising:
    an interface that is configured to enable communication and data transfer between the microprocessor and external components in a computer system.

6. The microprocessor of claim 5, wherein the interface is configured to enable the SMOI to retrieve instructions from the instruction store in the memory.

7. The microprocessor of claim 1, wherein the at least one instruction retrieved and executed by the SMOI changes a configuration of the SMOI.

8. The microprocessor of claim 1, wherein the at least one instruction retrieved and executed by the SMOI is based on a current configuration of the SMOI.

9. A method of handling an event using a microprocessor, said method comprising:
    generating, by a pattern detector circuit, a start signal in response to occurrence of at least one of a plurality of events from at least one of a plurality of external inputs monitored by the pattern detector circuit;
    receiving, by a clock, a start signal from the pattern detector circuit based upon a triggering event;
    starting, by the clock, a processing cycle to enable execution of instructions by a state machine and operation code interpreter (SMOI);

retrieving, by the SMOI, a stored instruction;

executing, by the SMOI, the retrieved instruction, wherein the SMOI is powered down until triggered to restart by the pattern detector circuit;

determining, by the SMOI, whether the retrieved instruction is a halting command;

outputting, by the pattern detector circuit, a logical bit when the retrieved instruction is the halting command;

executing a second instruction subsequent to the retrieved instruction when the logical bit of the pattern detector circuit is equal to a first logical value;

skipping the second instruction when the logical bit of the pattern detector circuit is equal to a second logical value; and executing a third instruction, wherein the third instruction is ordered subsequent to the second instruction.

10. The method of claim 9, further comprising:

halting, by the clock, a processing cycle that enables SMOI execution when the retrieved instruction is the halting command; and halting, by the SMOI, further execution of instructions until the clock receives a start signal from the pattern detector circuit.

11. The method of claim 9, further comprising:

configuring, with the retrieved instruction, the pattern detector circuit to monitor only one event.

12. The method of claim 9, further comprising:

configuring, with the retrieved instruction, the pattern detector circuit to simultaneously monitor multiple events from the at least one of the plurality of external inputs.

13. The method of claim 9, further comprising:

simultaneously monitoring, with the pattern detector circuit, a plurality of external inputs.

14. The method of claim 9, further comprising:

receiving, with the microprocessor, the stored instruction from a memory located outside of the microprocessor.

15. The method of claim 9, further comprising:

changing, based upon the retrieved instruction, a configuration of the SMOI.

16. The method of claim 9, further comprising:

basing the stored instruction retrieved by the SMOI on a configuration of the SMOI.

17. A method of handling an event using a microprocessor, said method comprising:

generating, by a pattern detector circuit, a start signal in response to a logical combination of a plurality of external inputs monitored by the pattern detector circuit;

receiving, by a clock, a start signal from the pattern detector circuit based upon a triggering event;

starting, by the clock, a processing cycle to enable execution of instructions by a state machine and operation code interpreter (SMOI);

retrieving, by the SMOI, a stored instruction;

executing, by the SMOI, the retrieved instruction, wherein the SMOI is powered down until triggered to restart by the pattern detector circuit;

determining, by the SMOI, whether the retrieved instruction is a halting command;

outputting, by the pattern detector circuit, a logical bit when the retrieved instruction is the halting command;

executing a second instruction subsequent to the retrieved instruction when the logical bit of the pattern detector circuit is equal to a first logical value;

skipping the second instruction when the logical bit of the pattern detector circuit is equal to a second logical value; and executing a third instruction, wherein the third instruction is ordered subsequent to the second instruction.

18. The method of claim 17, further comprising:

halting, by the clock, a processing cycle that enables SMOI execution when the retrieved instruction is the halting command; and halting, by the SMOI, further execution of instructions until the clock receives a start signal from the pattern detector circuit.

19. The method of claim 17, further comprising:

simultaneously monitoring, with the pattern detector circuit, the plurality of external inputs.

20. The method of claim 17, further comprising:

receiving, with the microprocessor, the stored instruction from memory located outside of the microprocessor.

21. The method of claim 17, further comprising:

determining, by the SMOI, the triggering event from the plurality of external inputs that triggered the pattern detector circuit to produce the start signal;

using, by the SMOI, a vector table to determine an instruction that corresponds to the triggering event, wherein the instruction that corresponds to the triggering event is the retrieved instruction.

22. The method of claim 17, further comprising:

changing, based upon the retrieved instruction, a configuration of the SMOI.

23. The method of claim 17, wherein the stored instruction retrieved by the SMOI is based on a configuration of the SMOI.

* * * * *